United States Patent [19]
Jacobs

[11] 3,860,294
[45] Jan. 14, 1975

[54] TRIM RING AND METHOD OF PRODUCING SAME

[75] Inventor: Leslie Floyd Jacobs, Farmington, Mich.

[73] Assignee: International Telephone and Telegraph Corporation, New York, N.Y.

[22] Filed: Jan. 13, 1972

[21] Appl. No.: 217,545

[52] U.S. Cl............................. 301/37 R, 301/37 B
[51] Int. Cl......................... B21d 53/26, B60b 7/02
[58] Field of Search... 301/37 R, 37 B, 37 T, 37 PB; 29/159 A; 113/116 R

[56] References Cited
UNITED STATES PATENTS

| | | | |
|---|---|---|---|
| 2,212,038 | 8/1940 | Lyon | 301/37 R |
| 2,757,972 | 8/1956 | Lyon | 301/37 B |
| 2,785,777 | 3/1957 | Horn | 301/37 B |
| 2,996,337 | 8/1961 | Hurd | 301/37 PB |
| 3,006,691 | 10/1961 | Lyon | 301/37 R |
| 3,146,032 | 8/1964 | Furman | 301/37 B |
| 3,594,046 | 7/1971 | Marshall | 301/37 P |
| 3,757,400 | 9/1973 | Beisch | 301/37 R |
| 3,757,401 | 9/1973 | Beisch | 301/37 R |

Primary Examiner—Philip Goodman
Attorney, Agent, or Firm—James B. Raden; Marvin M. Chaban

[57] ABSTRACT

A trim ring comprises an annulus of metal which is affixed to the rim of an automobile wheel to provide a decorative cover for the wheel rim. Disclosed is a trim ring formed into a collar having the general shape of a pie pan from which the base section or hub is removed. The base section is blanked and drawn to form a number of individual retaining clips. Each clip has a wheel rim engaging retention tab extending therefrom such that when the clips are angularly spaced along the outer periphery of the collar and clinched thereto, the tabs describe a series of retaining members spaced along the collar and coaxial thereto. The tabs have protruding teeth for grippingly engaging the rim of the wheel to secure the trim ring to the wheel rim.

Disclosed also is the method of originally forming the pie pan shape of the collar, blanking and forming the base section to fabricate retaining clips from the blanked circular sheet and affixing the clips to the collar to produce the wheel gripping members.

3 Claims, 12 Drawing Figures

PATENTED JAN 14 1975 3,860,294

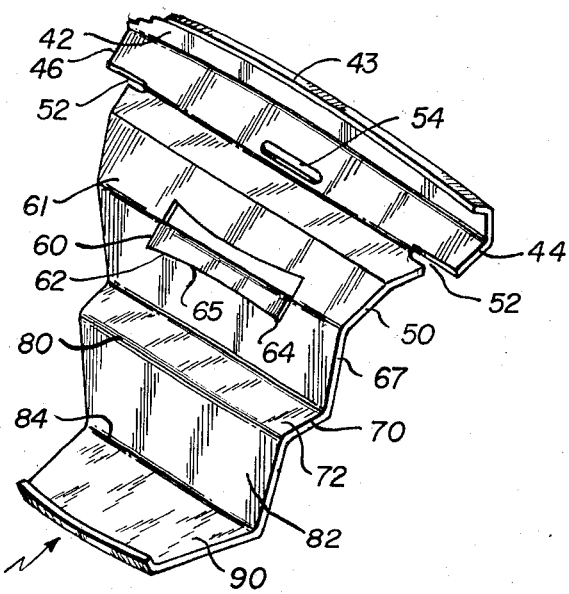
FIG. 3
FIG. 4
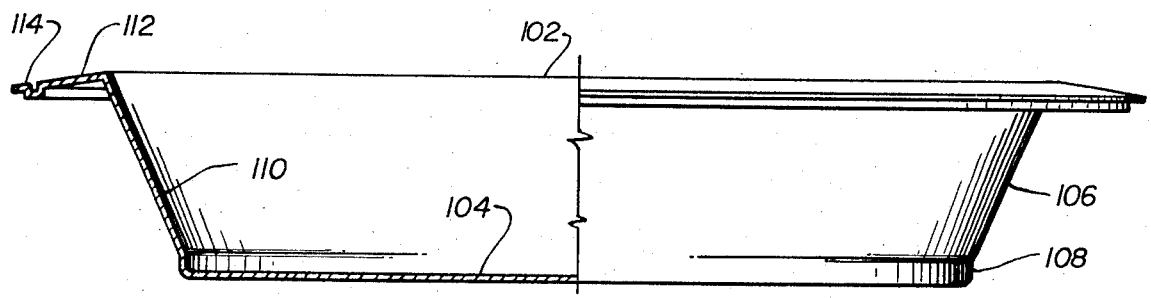
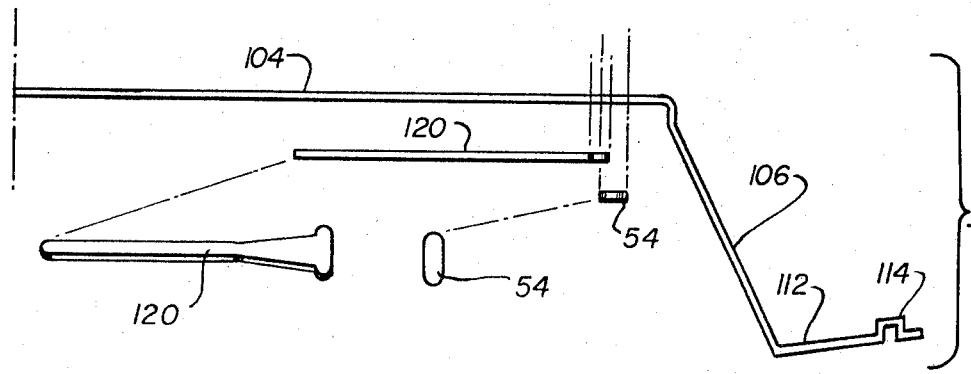
FIG. 5
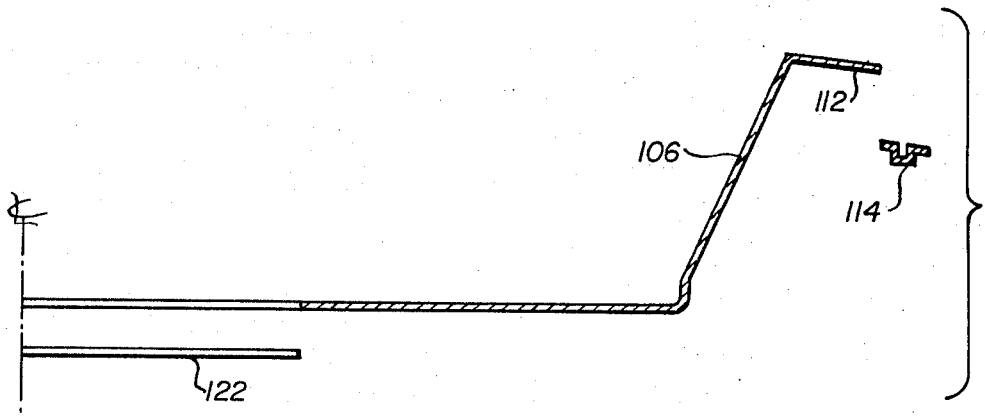
FIG. 6

TRIM RING AND METHOD OF PRODUCING SAME

BACKGROUND OF THE INVENTION

Trim rings for automobile wheels are very well known in the art. These rings generally comprise a shaped sheet metal collar to which is affixed an outer retaining ring. The outer ring is a stamped sheet member usually of stainless steel, suitably secured to the trim ring, the member having a plurality of spaced retention teeth designed to grip the wheel to which attached. The trim ring itself provides an exterior cover for the wheel rim which overlies the retention ring and wheel rim.

The retention ring is generally a rigid hoop shaped member which is clinched at one edge to one edge of the trim ring. The retention ring by its construction has its own structural rigidity to provide retention teeth disposed therefrom. The retention ring maintains the nominal diameter of the retention teeth and since the teeth are integral thereto the inherent construction provides the holding force for the retention teeth.

The usual trim ring and method of fabricating same combines two separate and individual components, i.e., (9) the retention ring with various types of retention tooth forms, and (b) the decorative or outer visible trim portion, with each part having individual processing procedures and tools. In the two piece structure, much material is wasted in die blanking and drawing the trim ring section, as the center portion is blanked out and considered scrap, and can only be used in the manufacture of some part using this type and size of material, otherwise it is considered and sold as scrap.

SUMMARY OF THE INVENTION

The present invention provides a trim ring which can be fabricated from a single sheet of suitable material such as stainless steel or the like. The sheet is formed and blanked into a decorative collar. The central hub sheet is blanked into a series of flat radially disposed clip members. The clip members are formed and a retention tooth or tab is slotted out to extend angularly from each clip member. The clip members may be held spaced from one another by a spider or skeleton or metal after detachment from the collar to ease the subsequent mounting of the clip members onto the trim ring. The individual clip members are clinched to the collar at both ends of each clip member. Thus, each clip member is held rigidly in place by the clinching at both its ends, the clinching tending to force the ends of each clip member together with a compressive force. Each clip member, as formed has an intermediate stepped area between its essentially parallel ends, the stepped portion aiding the compressive forces acting on its opposed edges thereby maintaining each clip member rigidly in place.

In an alternate fabricating process, the clip members or clips may be detached from the spider and be individually mounted and clinched to the trim ring, the clips being angularly spaced about the trim ring periphery. The clips may be positioned in edge contact with one another or may be spaced apart as desired. I have found that a minimum of eight clips should be used. An optimum number of clips has been found to be twelve.

It is, of course, necessary that the retention teeth form a discontinuous ring of nominal diameter which can be checked and maintained, the teeth having sufficient holding force to maintain the engagement of the trim ring to the wheel on which mounted.

It is therefore an object of the invention to provide a new and improved trim ring retention apparatus.

It is a further object of the invention to provide a retention apparatus for a trim ring comprised of a series of retention teeth-bearing clips mounted about the periphery of the trim ring.

It is a still further object of the invention to provide a new and improved method for making a trim ring.

It is a still further object of the invention to provide a method of fabricating a trim ring with retention clips by blanking out the center of the ring for use as the material for fabricating the trim ring retention clips.

BRIEF DESCRIPTION OF THE DRAWINGS

FIG. 3 is a perspective view of a clip member as used herein;

FIGS. 4–11 show a trim ring in section (and in plan view where indicated) embodying the successive steps of my fabrication process and;

DETAILED DESCRIPTION

Figure 1:
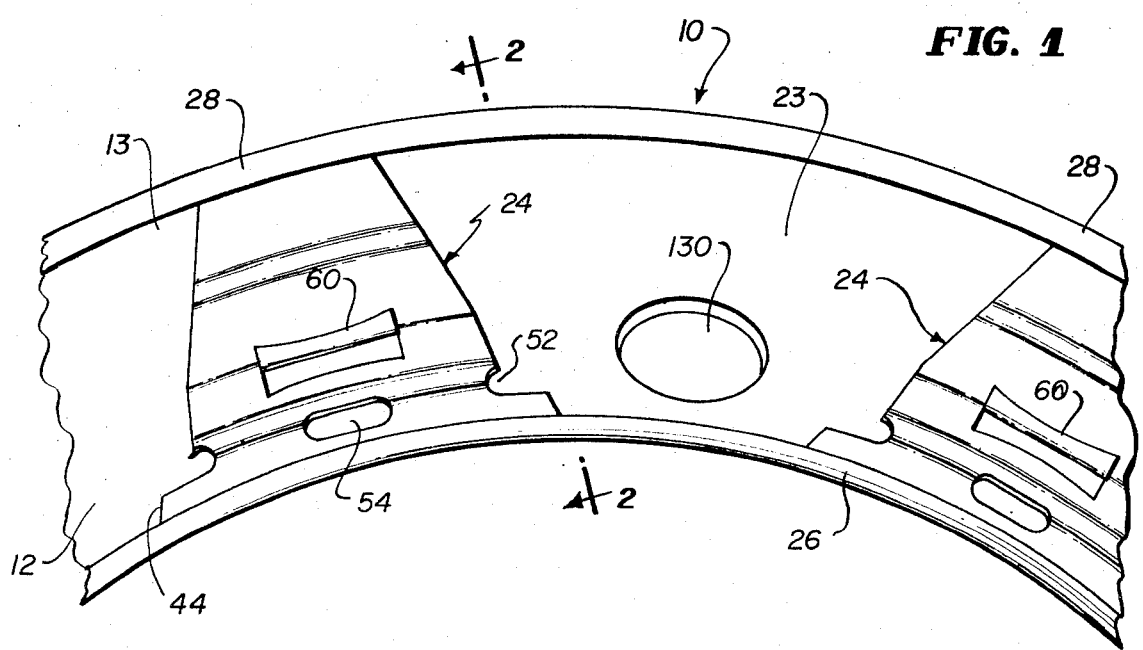
FIG. 1 is a partial side elevational view of a trim ring employing my invention.
Figure 2:
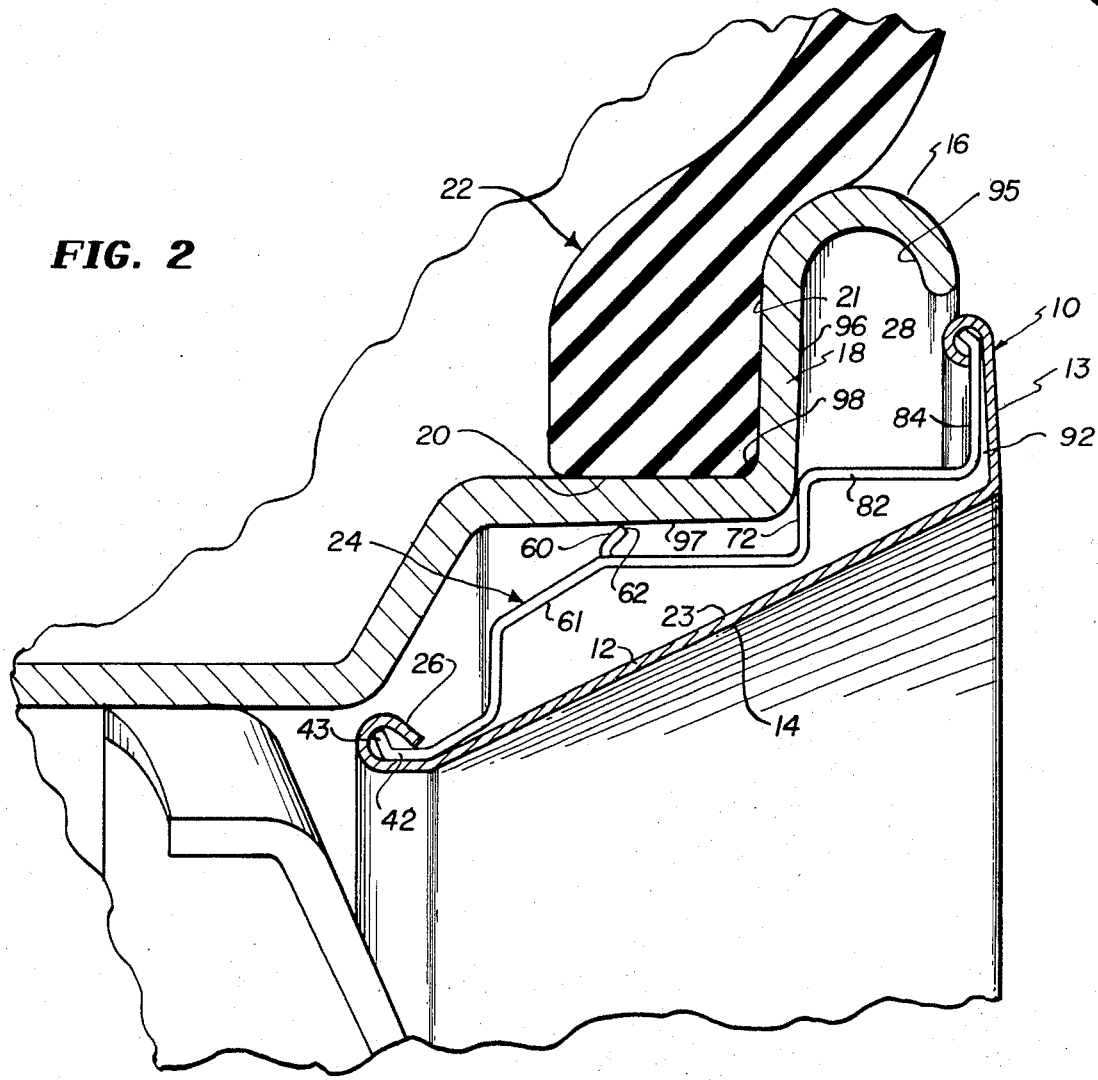
FIG. 2 is a section view taken along line 2—2 of FIG. 1, with the ring shown as mounted on a typical automobile wheel.

Turning now to the drawings, in FIGS. 1 and 2, I show a trim ring 10 incorporating my new design.

The trim ring 10 includes an essentially frusto-conic wall 12 with a flanged outboard edge wall 13. The concave surface 14 of wall 12 and the flange wall 13 are exposed when the trim ring is secured to the rim 16 of a standard tire wheel 18 in the manner shown best in FIG. 2 to provide a decorative or styled effect. The wheel rim 16 seats and engages the edge walls 20 and 21 of a tire, such as the tubeless tire 22, in a known manner.

Secured to the convex surface 23 of the trim ring 10 are a series of clip members 24, the clip members being held firmly against the surface 23 by inturned clinched edges 26 and 28 at both the respective inboard and outboard edges of the trim ring wall 12. Edges 26 and 28 are formed over against the clip members 24 to hold the members firmly in place against the convex trim ring surface 23.

The clip members 24, one of which is shown in greatest detail in FIG. 3 includes a generally tapering sheet body pierced and formed into the shape as shown. Preferably, the clip member is made of stainless steel material fabricated from material removed from the hub of the trim ring. In other forms, the clip members 24 could be made of any suitable rigid material which can be compressed within the clinched edges 26 and 28 and which can be formed or molded into the shape shown. As will be explained, the clip members must perform a gripping action on the adjacent wheel rim, hence the material used for the clip members must be capable of exerting the gripping force.

Further, in FIG. 1, the clip members 24 are shown angularly separated on the trim ring. It is clear that these clip members may adjoin one another, if desired, to perform the required gripping function.

A clip member 24, seen best in FIGS. 1-3 is a formed or molded sheet member with tapering sidewalls. A number of curved shoulders extend across the width of the clip member. These shoulders divide the clip member longitudinally into a plurality of lateral sections. A first of these sections 52, include a rim portion 43 upturned to hold the section within the inboard clinch of the trim ring and a wing portion 44 angled from the rim portion 43. The wing portion is the section of greatest lateral width of the clip member sections. Section 42 is of short longitudinal extent in its protrusion from its outer rim 44 to shoulder 46. The second section 48 extends angularly from shoulder 46. The sidewalls 50 of section 48 generally tapers inwardly. Notches 52 are inset in each sidewall 50 and intermediate therebetween a centrally positioned oval cutout 54 is blanked or otherwise removed from the clip member adjacent shoulder 46.

Outboard of the notches, the clip member in section 42 has laterally extending winged portion 44 which are designed to rest against the adjacent trim ring wall and provide extended rigid bracing of the clip member against the trim ring once the clip member is assembled to the trim ring. The rim portion 43 is designed to hold the section 42 firmly within the clinched trim ring edge.

Within section 48, the clip member is stepped with an engaging tab 60 upstanding from the clip body step portion 61 and terminates in a recurved toothed edge 62. Edge 62 is shown to have two barbs or teeth 64, one at each end separated by an arcuate wall 65. In other forms, not shown, continuous alignment of teeth serrations or jagged edges may be formed along edge 62. Edge 62 acts to grip the adjacent wheel rim and should have teeth or jagged edges to perform the gripping action. The tab 60 is generally rectangular and its main body portion 67 lies generally parallel to clip member stepped portion 61 of the clip member. From the main body portion of the tab, the teeth 64 protrude in a recurved manner to prevent ready withdrawal of the teeth from their engagement with the wheel rim.

A shoulder 70 divides section 48 from the adjacent section 72. Section 72 is angled from section 48, is designed to rest against the wheel rim and is of comparatively short extent.

Another shoulder 80 separates section 72 from the fourth section 82 which is stepped approximately rectangularly from section 80. Section 82 terminates in a shoulder 84 which defines one edge of the final section 90, section 90 being offset approximately rectangularly from section 82. Shoulder 84 is adapted to rest within an annular knee 92 in surface 23 of the trim ring.

As can be seen best in FIG. 2, the trim ring in cross-section has at its inboard side clinched edge 26 which traps and holds the rim portion of a clip member within the clip section 42. The trim ring slopes outwardly from the recurved clinched edge along the frusto-conic wall 12 to the annular knee 92 which seats and receives shoulder 84. From the knee 92 the trim ring body extends in flange wall 13 leading to the outboard clinched edge 28 of wall 13 which traps and holds the final section 90 of the clip member.

The wheel rim 16 as shown in FIG. 2 has an annular curled outer edge 95 from which the rim leads into a ring section having a wall 96 disposed 90° therefrom and a basal section wall 97, the ring section walls 96 and 97 receiving and holding the edge of the tire 22. Between walls 96 and 97 is an annular knee 98 which supports and positions the trim ring by receiving thereagainst clip member section 72. Teeth or barbs 74 engage and grip wall 97 to secure the clips and the trim ring to the wheel rim.

As mentioned previously, a series of clip members are spaced along the outer wall of the trim ring to provide a series of gripping members for securing the trim ring to the wheel. The clip members are held in tension between their clinched ends with the stepped portion arching above the trim ring to support the gripping teeth 64. The clip members space the ring from wheel wall 96, and with the toothed tabs 60 aligned in a diametral plane grip and hold the wheel.

In describing the process or method by which the trim ring is fabricated, a number of advantages of the final construction will be noted. The process shown by FIGS. 4-11 will now be described.

The first step in the process is to blank a circular disc (not shown) from a flat sheet of suitable material such as stainless steel. The blank is then drawn into a "pie pan" 102 as shown in cross-section in FIG. 4. The pan of FIG. 4 has a flat central hub portion 104 from which upstand the sidewall 106, the sidewall having a short annular wall 108 leading to the frusto-conic wall 110 of required height. Wall 110 terminates in a sloping outwardly directed flange 112. The flange has a depression 114 adjacent its outer rim as a result of the drawing operation, in the manner shown by FIG. 4.

In FIG. 5, I show the results of the next step in my process. In this step, I pierce and trim the hub 104 of the first draw or pan to partially shape the clip members which are to be formed from the hub portion. In the embodiment, as shown, twelve clip members are to be formed from the pan hub 104. As the second step, I pierce T fingers 120 and the oval cutouts 54 from the pan hub, and remove these.

Figure 12:
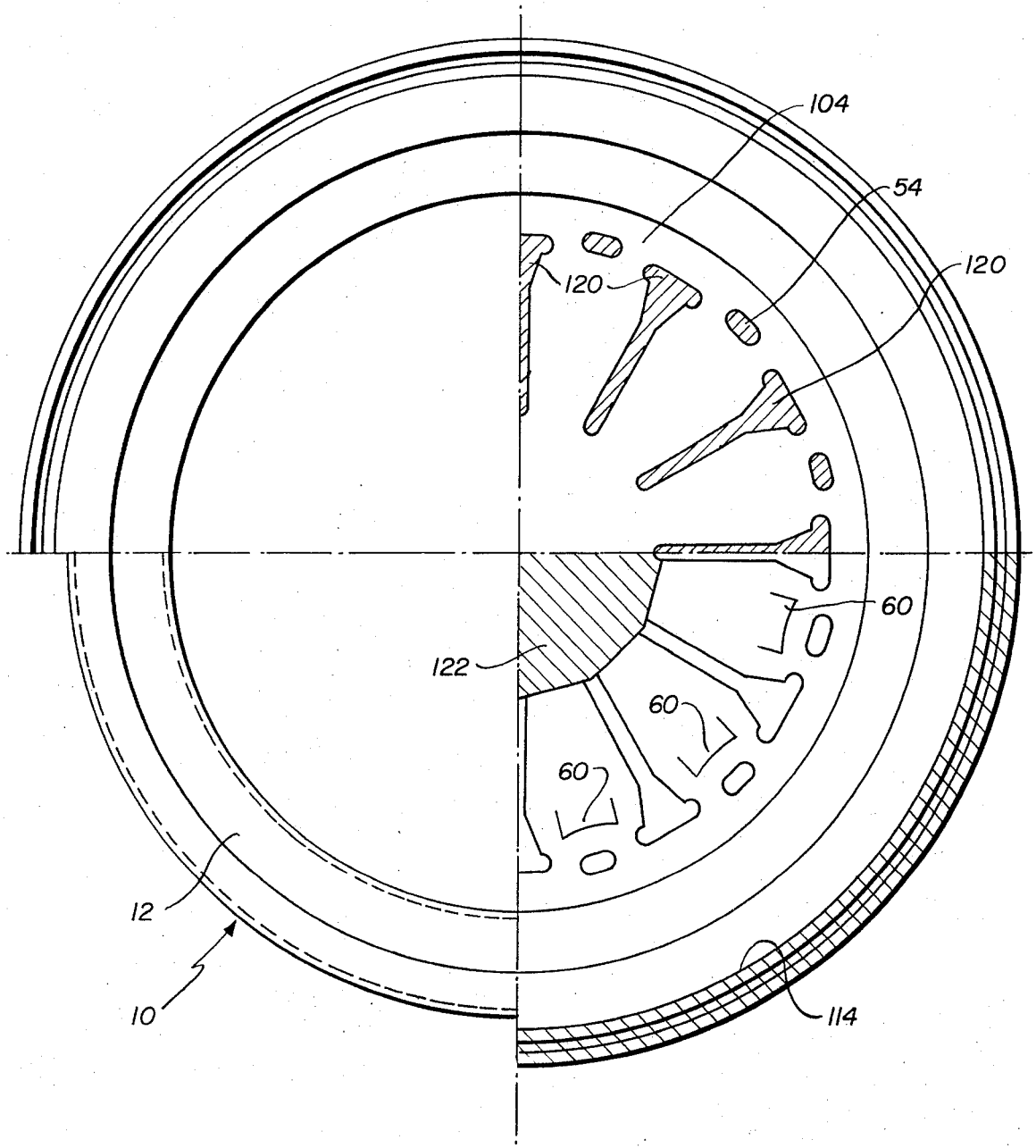
FIG. 12 is a side elevational view of the trim ring in a partially fabricated state.

The fingers 120 space apart the respective clip members. The resulting structure is shown in the upper right quadrant of FIG. 12.

The next step in my process comprises a combined finish pierce and trim operation to the condition as shown in FIG. 6, there being one retention tab centrally positioned within each clip member. The central portion 122 of the hub is sheared from the hub portion and the retaining tabs 60 are lanced and formed down to the shape shown in the lower right quadrant of FIG. 12. The flange 112 is trimmed to size inwardly of the depression 114, and the tip of the tab is formed to the shape shown in FIG. 6.

Figure 7:
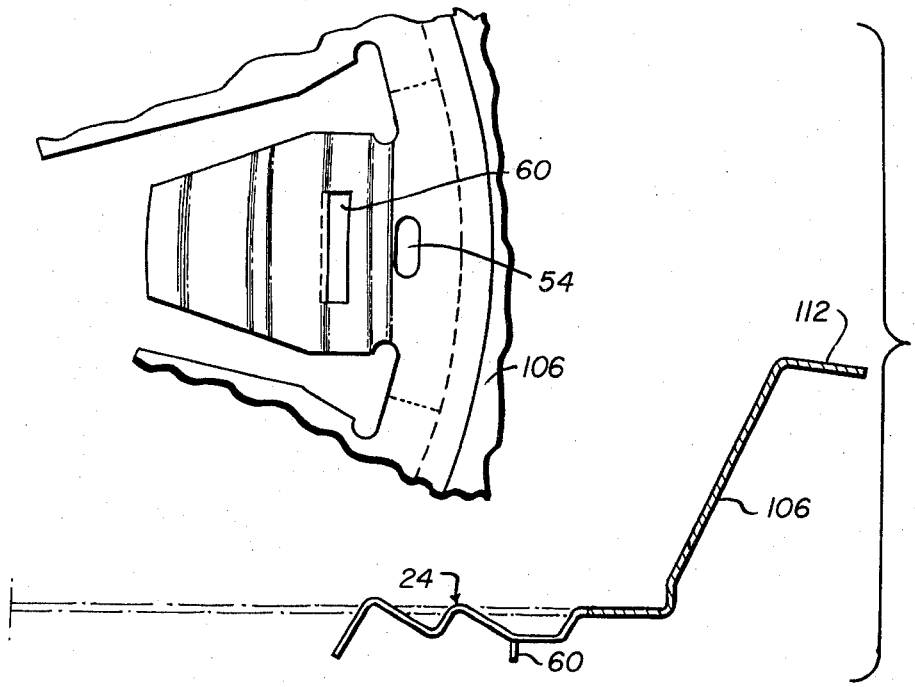
Figure 8:
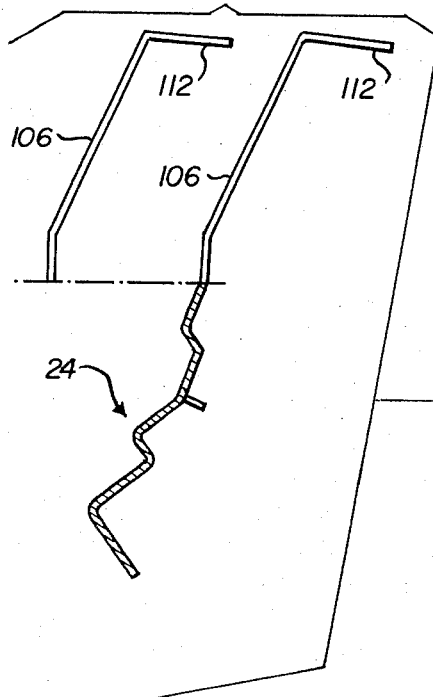

This operation is a forming operation forming the offsets, steps and shoulders in the inner sections of the clip member and in the tab leading to a structure having a cross-section as shown in FIG. 7 corresponding to the curvature of the trim ring.

The next step comprises flanging down the clip members 24 from their connection to the pan hub portion 104 and preparing the clip members for severance from the pan. The flanged down position is shown in the lower FIG. 8, the upper figure showing the trim ring with the clips removed, the removal being affected by means of a Brehm or "shimmy" die in separating the clips from the trim ring along a circumferential line.

The clip members may still be joined together in a ring at this step, although separated from the pie pan structure.

Figure 9:
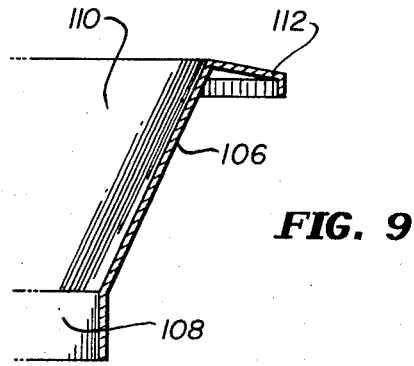

With the clip members having been separated from the trim ring, the trim ring major dimensions must be controlled and the clinching rims formed. To this end, a flanging operation produces both on the inner and on the outer diameters of the trim ring, the flanges necessary for the clinching operations. These flanges are shown in FIG. 9, in position for later mounting thereto of the clip members. Alternatively, the clip members may be severed from one another at the conclusion of this step.

In the next step, the clip member shape is completed by using a cone forming die to size the ring and to finish form the shape and attitude angle of the engaging teeth to their final shape.

Figure 10:
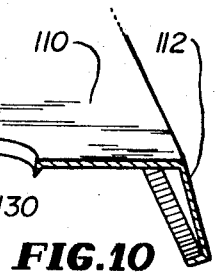

At one specific location in the trim ring a hole 130 is pierced and flanged to accept the valve stem (not shown) of a tire as shown in FIG. 10.

Figure 11:
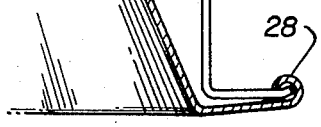

The final step is that of assembling the clip members to the trim ring and placing the assembly in a clinching die to clinch both the inner and outer flanges about the ends of the clip members to firmly secure the clip members to the trim ring in the manner shown in FIG. 11.

As finally assembled (as shown in FIGS. 1, 2 and 11), section 48 of each clip member may be spaced from the adjoining trim ring surface 23 but the shoulder 84 of each clip member 24 should be resting in the annular knee 84 of the trim ring to control the nominal diameter of the clips relative to the wheel. The clip members are in tension with the teeth of the successive tabs forming a discontinuous circular edge for gripping the wheel and aligning the trim ring adjacent the rim edge of the wheel decoratively covering the wheel rim. The tabs have a comparatively short unsupported height above the step of the clip members to produce a comparatively rigid support structure.

While there has been described what is at present thought to be a preferred embodiment of my invention, it is understood that modifications may be made therein and it is intended to cover in the appended claims, all such modifications which fall within the true spirit and scope of my invention.

What I claim is:

1. A trim ring adapted to be secured to a generally annular flanged wheel rim, the contour of the wheel rim having an axially outer, radial wall terminating at a shoulder leading to an axially inwardly directed wall, said last-mentioned wall leading to an angled interface with the generally planar rim body, and comprising a rigid decorative member adapted to rest within a central annulus of the wheel rim, said trim ring comprising an annular wall, annular inturned flanges at the axial extremities of said trim ring wall facing toward the adjacent wheel rim, a plurality of clip members angularly spaced about said annular wall member, each of said clip members having the ends thereof captured and held firmly within said flanges to bow an intermediate portion of each of said clip members toward the adjacent wheel rim, said intermediate portion including a plurality of stepped surfaces generally parallel to the contoured walls of said rim and a toothed member on an axial wall of said intermediate portion for engaging and gripping the adjacent axial wall wheel rim.

2. A trim ring as claimed in claim 1 wherein each clip member includes in said intermediate portion a shoulder adjacent the axially directed annular wall bearing said tooth spaced from said flanges, said shoulders adapted to engage an adjacent axial wall of said wheel rim, said shoulder spaced from said toothed member to combinedly prevent movement of said trim ring relative to said wheel rim in either axial direction.

3. In a wheel structure adapted to mount on a tire rim having a first annular face in one plane with a stepped shoulder thereon leading to a radially disposed annular face, the invention comprising a generally rigid trim ring adapted to be mounted on the tire rim, the trim ring including radially inner and outer marginal portions, and an alignment of rigid finger clips joined together at the inner ends thereof and assembled on said trim ring and disposed in space between the trim ring and the tire rim, each of said clips including opposite terminal ends held within said marginal portions to bow said clip toward engagement with the wheel rim, both of said trim ring marginal portions having an inturned flange crimpingly engaging therein the terminal ends of said finger clips to grip each finger clip between said marginal portions, each finger clip having an intermediate section including a plurality of successive stepped walls generally similar to like walls of the trim ring, a first stepped wall retainingly engageable with the rim flange outwardly of the rim shoulder, each clip intermediate section including a wall generally parallel to the adjacent wall of said rim, a toothed member on said last-mentioned clip wall engaging the peripherally disposed face of said wheel rim, each said toothed member spaced from said wheel rim shoulder to prevent axial movement of said trim ring relative to said rim.

* * * * *